United States Patent [19]

Gath et al.

[11] Patent Number: 4,751,400

[45] Date of Patent: Jun. 14, 1988

[54] ELECTROHYDRAULIC SWITCHING DEVICE

[75] Inventors: Dietmar Gath, Schoeffengrund; Armin Eiser, Friedberg; Peter Grone, Frankfurt am Main, all of Fed. Rep. of Germany

[73] Assignee: Alfred Teves GmbH, Frankfurt, Fed. Rep. of Germany

[21] Appl. No.: 508,030

[22] Filed: Sep. 16, 1986

[30] Foreign Application Priority Data

Sep. 16, 1985 [DE] Fed. Rep. of Germany ....... 3532988

[51] Int. Cl.[4] .............................................. H02J 1/00

[52] U.S. Cl. .................................. 307/118; 200/82 C; 200/82 D; 200/82 A; 200/82 R; 340/626

[58] Field of Search ................ 200/82 C, 82 D, 82 A, 200/82 R, 302.1, 84 R; 307/118; 340/611, 626

[56] References Cited

U.S. PATENT DOCUMENTS

| | | | |
|---|---|---|---|
| 3,043,929 | 7/1962 | Guthrie | 200/83 |
| 3,945,686 | 3/1976 | Orzel | 200/82 D X |
| 4,047,048 | 9/1977 | Demido | 307/118 |
| 4,051,338 | 9/1977 | Harris | 200/82 C X |
| 4,082,960 | 4/1978 | Denamps et al. | 307/118 |
| 4,123,635 | 10/1978 | Rostron | 200/82 A |
| 4,400,602 | 8/1983 | Kuromitsu et al. | 200/82 C |
| 4,400,628 | 8/1983 | Morris et al. | 307/118 |
| 4,480,160 | 10/1984 | Stifelman | 200/82 D X |
| 4,520,245 | 5/1985 | Ochsner | 200/82 R |
| 4,562,358 | 12/1985 | Hösel | 307/118 |
| 4,614,849 | 9/1986 | Miller | 200/82 R X |
| 4,638,132 | 1/1987 | Miller | 200/82 R X |
| 4,667,940 | 5/1987 | Jaillet | 200/82 D X |

FOREIGN PATENT DOCUMENTS

| | | |
|---|---|---|
| 0674655 | 11/1963 | Canada . |
| 2421763 | 11/1975 | Fed. Rep. of Germany . |
| 3140800 | 4/1983 | Fed. Rep. of Germany . |

OTHER PUBLICATIONS

Fluid, Kennziffer Nr. 154, Feb. 1982, Germany.
Herion, S. 24–28, Feb. 1983, Germany.

*Primary Examiner*—William M. Shoop, Jr.
*Assistant Examiner*—Sharon D. Logan
*Attorney, Agent, or Firm*—James B. Raden

[57] ABSTRACT

An electrohydraulic switching device for emitting electric control signals in dependence on supplied pressure signals. The switching device has a housing wherein a piston pressurizable by the inlet pressure is arranged so as to be axially displaceable. The piston is spring-loaded against the inlet pressure by means of a compression spring arranged between a spring plate and a guide means. The spring plate is secured at the piston by means of a snap ring, and the switching device has an actuating plate for actuating an electric switching mechanism. The actuating plate is positively connected with the piston, with the compression spring at its end facing the switching mechanism being axially guided by the guide sleeve. To reduce the frictional forces acting between the individual components and to ensure a reliable hydraulic sealing of the chamber accommodating the switching mechanism, an elastic sealing element (21) is provided wherein the piston (7) is guided, with the compression spring (6) at its end opposite to the guide sleeve (20) being centered by the spring plate (10).

15 Claims, 1 Drawing Sheet

Fig. 1
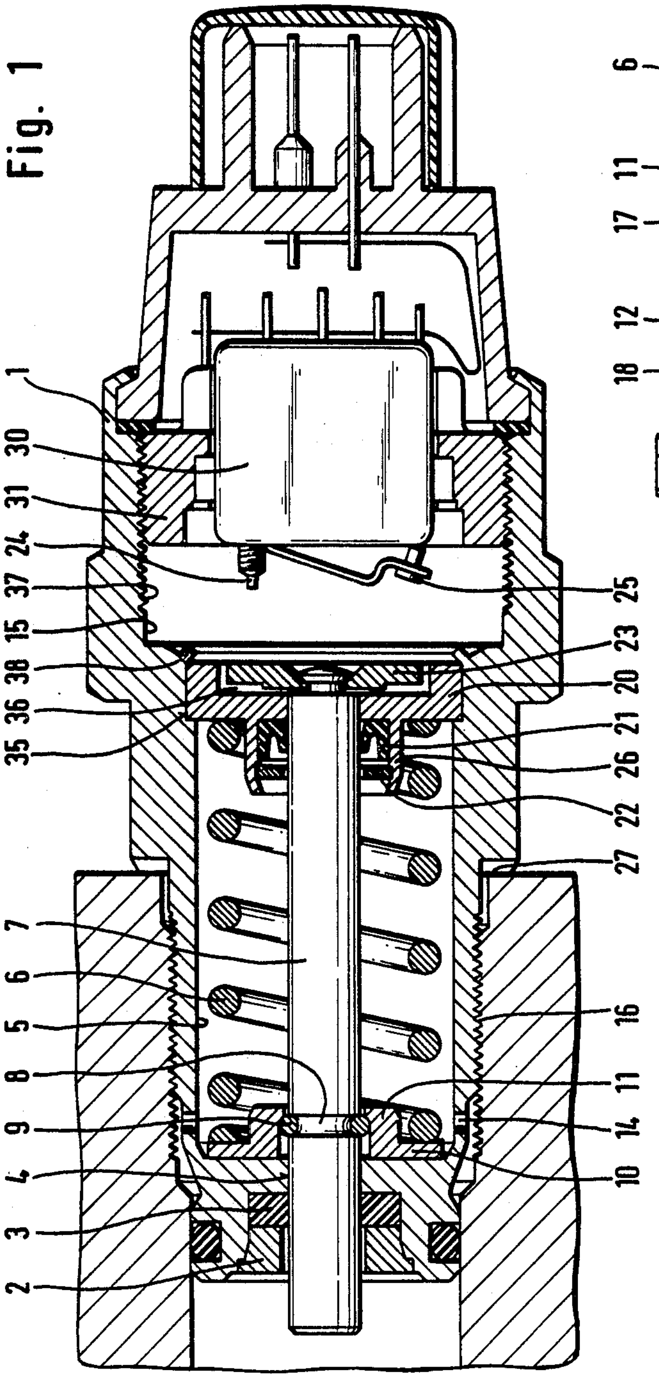
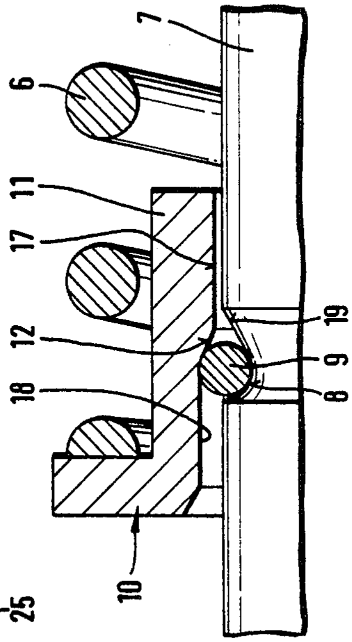
Fig. 2

ELECTROHYDRAULIC SWITCHING DEVICE

BACKGROUND OF THE INVENTION

This invention relates to an electrohydraulic switching device for generating electrical control signals as a function of pressure signals applied thereto.

A known switching device of this type consists of a housing, and a piston guided in an axially displaceable manner in the housing. One of the piston ends carries an actuating plate for actuating an electric switching mechanism, as well as of a guide sleeve locking a cylinder bore within the housing and having a tubular extension. The piston is provided with a plastic sealing ring which prevents pressure medium from flowing from the hydraulically pressurized side into the cylinder bore within the housing. Arranged in the cylinder bore is a compression spring which supports itself with one of its ends at a spring plate, while at the other end it is axially guided by the tubular extension of the guide sleeve. A snap ring secures the spring plate against axial displacement against the direction of actuation of the piston. The snap ring is supported in a square groove of the piston. A screw screwed into a respective threaded bore within the piston end holds the actuating plate at the piston end facing the electric switching mechanism. Further, the actuating plate has a cylindrical guide portion slidingly guided within the tubular extension of the guide sleeve.

As it is impossible to ensure a satisfactory sealing of the cylinder bore when using the plastic sealing ring, a gasket is provided which is seated in an outside circumferential groove of the piston and the sealing lips of which rest against the inside wall of the tubular extension of the guide sleeve. Along with a sealing ring supported in a circumferential groove of the guide sleeve, the gasket serves to seal the cylinder bore hydraulically with respect to the housing chamber accommodating the switching mechanism. Sheared-in indentations hold the guide sleeve in the housing at four points.

In the known switching device, however, it has been noted that during a pressurization of the piston and during the piston movement ensuing thereupon, frictional forces occur both between the sealing lips of the gasket and the inside wall of the tubular extension of the guide sleeve and between the inside wall and the cylindrical guide portion of the actuating plate. The frictional forces have a negative influence on the switching behavior of the switching device. Further, due to the manufacturing tolerances of the individual components, there is a danger that the spring plate stamped out of sheet metal will be deformed by the action of the strong force of the compression spring so as to be caused to slide beyond the snap ring, thus leading to the destruction of the entire switching device.

It is thus an object of the present invention to provide an electrohydraulic switching device of the type referred to above wherein the friction is minimized. At the same time, the switching device shall be of simple design and allow low manufacturing cost.

SUMMARY OF THE INVENTION

According to the present invention, the frictional forces acting between the individual components are largely reduced, and while the cylinder bore is sealed reliably with respect to the housing chamber accommodating the switching mechanism. At the same time, the compression spring is prevented from jamming in the cylinder bore in the housing. Further, due to the shorter guide surfaces, the danger of cogging of the piston is reduced to a minimum.

An expedient further development consists in that the elastic sealing element is formed by a groove ring wherein the piston is slidingly guided. The groove ring rests in a tubular extension of the guide sleeve and is secured by a retaining ring against axial displacement. This measure allows particularly low friction values to be achieved which enable a precise adjustment of the switch points of the electric switching mechanism.

An advantageous further embodiment is achieved by securing the guide sleeve within the housing by means of a sheared-in indentation or by riveting, which, together with the axially outside edge of the guide sleeve, forms a sealing seat serving to seal the cylindrical bore of the housing with respect to a bore accommodating the switching mechanism. Thus, an essential simplification of the switching device is achieved as well as a reduction in the manufacturing expenses as a result of the elimination of the arrangement of a sealing ring supported in a circumferential groove of the guide sleeve, which it should be appreciated, is required in the prior art.

Further, the switching device according to the present invention may incorporate a design according to which the actuating plate is connected with the piston by means of a riveting, preferably by means of a wobble riveting, and according to which the actuating plate is arranged at an axial distance with respect to the guide sleeve when the switching device is unpressurized. Because of this measure, both the threaded bore provided at one end of the piston and the internal hexagon required at the other end of the piston and serving to hold the piston during the fastening of the actuating plate or rather during the tightening of the screw holding the actuating plate can be eliminated. Thus, a considerably simpler piston may be used. Further, due to relieving the actuating plate from load, a wear-out or loosening, respectively, of the riveting is prevented, which could cause a shift in the switch points.

A reliable securing of the spring plate at the piston against axial displacement in the direction of actuation of the piston is achieved in that the axial bore of the spring plate has a recess having a butt ramp in the piston direction of actuation, which butt ramp, together with the longitudinal axis of the switching device, encloses an angle of 30° to 60° and preferably of 45°. According to a further embodiment of this invention, it is expedient to rest the snap ring securing the spring plate at the piston in a rounded circumferential groove having an insertion ramp which, together with the longitudinal axis of the switching device, encloses an angle of 30° to 45° and preferably of 40°.

BRIEF DESCRIPTION OF THE DRAWING

An embodiment of this invention will now be explained in more detail, reference being made to the accompanying drawing wherein:

FIG. 1 is a longitudinal section taken through an electrohydraulic switching device according to the invention; and, FIG. 2 is the arrangement of the spring plate at the piston in an enlarged scale.

DETAILED DESCRIPTION

In the drawing, reference numeral 1 in FIG. 1 designates a housing screwed into a portion of a hydraulic system (not shown in greater detail). The fastening with the hydraulic system is enabled by an external thread 16 formed at the housing 1. The housing 1 has three coaxial bores 4, 5, and 15, one end of a piston 7 being supported in an axially displaceable manner in the bore 4. Hydraulic sealing of the bore 4 is ensured by a sealing ring 3 made of plastic and secured by a retaining ring 2 in a recess of the housing 1. Referring to the drawing, the left end of the piston 7 protrudes from the housing 1 and is acted upon by hydraulic pressure.

Several radially extending channels 14 symmetrically arranged in the housing wall end near the external thread 16. The channels 14 connect the cylindrical bore 5 with the atmosphere. Together with the play existing between the internal thread of the hydraulic system and the external thread 16 formed at the housing 1 as well as with a dripping edge 27 provided at the housing 1, the radially extending channels 14 enable a quick discharge of the hydraulic pressure medium which has entered in the bore 5. At the left end of the housing 1, a spring plate 10 is arranged in the cylindrical bore 5. The collar 11 of spring plate 10 centers a compression spring 6. It is thus ensured that the compression spring is fixed within the cylindrical bore 5 without having contact with the wall of said bore 5.

A snap ring 9 secures the spring plate against axial displacement against the direction of actuation of the piston 7. Snap ring 9 is supported in a circumferential groove 8 of the piston and may be provided as a round wire snap ring. From the illustration of these components shown in FIG. 2 it can be seen that the axial bore 17 of the spring plate 10 has a cylindrical recess 18 which is provided with a butt ramp 12 in the piston 7 direction of actuation. The butt ramp arrangement is inclined at an angle of 30° to 60° to the longitudinal axis of the switching device. The circumferential groove 8 of the piston 7, which is to receive the snap ring 9, has a rounded design and an insertion ramp 19 which, together with the longitudinal axis of the switching device, encloses an angle of 30° to 45°.

The other end of the compression spring 6 supports itself at a radial surface of a guide sleeve 20 seated in a recess 35 of the housing 1 and held therein by a sheared-in indentation 38 or a riveting, respectively. It should be noted that the sheared-in indentation 38 or the riveting, respectively, is not only provided for restraining the guide sleeve 20 but that it also simultaneously serves to seal the cylindrical bore 5 with respect to the bore 15 in the housing 1, which bore 15 is coaxial with bore 5 and accommodates an electric switching mechanism 30.

The axially outside front face of the guide sleeve 20 has a recess 36 which, together with an actuating plate 23 arranged therein, encloses a marked radial play. Referrring to the drawing, the actuating plate 23 is fastened at the right end of the piston 7 by means of a riveting, preferably by means of a wobble riveting. In doing so, the arrangement is preferably such as to ensure that, in the illustrated rest position of the switching device, the axially inside radial surface of the actuating plate 23 is at an axial distance in respect of the bottom surface of the recess 36 in the guide sleeve 20. On its axially inside surface the guide sleeve 20 carries a tubular extension 26, a sealing element being rested in the cylindrical recess thereof. In the illustrated exemplary embodiment, the sealing element is formed by an elastic groove ring 21. Additionally, a locking ring 22 is provided in the cylindrical recess. Locking ring 22 keeps the groove ring 21 in its axial position. The groove ring 21 is arranged coaxially with regard to the piston 7. The arrangement is such that the piston is slidingly guided through the opening of the groove ring 21. When assembling the switching device, the slipping-on of the groove ring 21 onto the piston 7 is facilitated by the insertion ramp 19 mentioned in connection with FIG. 2.

The largest diameter bore 15 in the housing 1 has an internal thread 37 cooperating with an external thread of a carrying member 31 wherein the electric switching mechanism 30 is supported. The switching mechanism 30 comprises two switches, which are know per se, the actuating elements 24, 25 of which will be brought into effective contact with the actuating plate 23 during the operation of the electrohydraulic switching device. As the mode of operation of such switching devices is well known it need not be explained in greater detail herein.

What is claimed is:

1. An electrohydraulic switching device for emitting electric control signals as a function of supplied pressure signals, which switching device has a housing wherein a piston pressurizable by the inlet pressure is arranged so as to be axially displaceable, said piston being spring-loaded against the inlet pressure by means of a compression spring arranged between a spring plate and a guide sleeve, which spring plate is secured at the piston by means of a snap ring, and which switching device has an actuating plate for actuating an electric switching mechanism, which actuating plate is positively connected with the piston, with the compression spring at its end facing the switching mechanism being axially guided by the guide sleeve, and wherein an elastic sealing element (21) is provided where the piston (7) is guided by the guide sleeve and wherein the compression spring (4) at its end opposite to the guide sleeve (20) is centered by said spring plate (10), said elastic sealing element (21) providing the sole seal between the piston (7) and the guide sleeve (20).

2. An electrohydraulic switching device as claimed in claim 1, wherein the elastic sealing element (21) is formed by a groove ring where the piston (7) is slidingly guided and sealed.

3. An electrohydraulic switching device as claimed in claim 2, wherein the groove ring (21) rests in a tubular extension (26) of the guide sleeve (20).

4. An electrohydraulic switching device as claimed in claim 3, wherein the groove ring (21) is secured against axial displacement by means of a locking ring (22).

5. An electrohydraulic switching device as claimed in claim 4, wherein the guide sleeve (20) is fastened in the housing (1) by means of a sheared-in indentation (38) or a riveting, respectively.

6. An electrohydraulic switching device as claimed in claim 5, wherein together with the axially outside edge of the guide sleeve (20), one of the sheared-in indentation 38 and the riveting, respectively, forms a sealing seat serving to seal the cylindrical bore (5) of the housing (1) in respect of a bore (15) accommodating the switching mechanism (30).

7. An electrohydraulic switching device as claimed in claim 6, wherein the actuating plate (23) is connected with the piston (7) by means of wobble riveting.

8. An electrohydraulic switching device as claimed in claim 7, wherein the actuating plate (23) is arranged at an axial distance in respect of the guide sleeve (20) when the switching device is unpressurized.

9. An electrohydraulic switching device as claimed in claim 8, wherein an axial bore (17) of the spring plate (10) has a recess (18) having a butt ramp (12) in the direction of actuation of said piston (7).

10. An electrohydraulic switching device as claimed in claim 9, wherein together with the longitudinal axis of the switching device, the butt ramp (12) encloses an angle of 30° to 60°.

11. An electrohydraulic switching device as claimed in claim 9, wherein the snap ring (9) securing the spring plate (10) at the piston (7) is supported in a rounded circumferential groove (8) having an insertion ramp (19).

12. An electrohydraulic switching device as claimed in claim 11, wherein together with the longitudinal axis of the switching device, the insertion ramp (19) of the circumferentail groove (8) encloses an angle of 30° to 45°.

13. An electrohydraulic switching device as claimed in claim 10, wherein said angle is approximately 45°.

14. An electrohydraulic switching device as claimed in claim 9, wherein an external thread (16) is formed at the housing (1), said external thread serving to connect a hydraulic system and near said external thread at least one radial channel (14) ends which connects the bore (5) with the atmosphere.

15. An electrohydraulic switching device as claimed in claim 14, wherein at the external thread (16) end averted from the channel (14) a dripping edge (27) is formed at the housing (1).

* * * * *